INVENTOR.
HENRY WEBSTER

Feb. 14, 1961 H. WEBSTER 2,971,579
GRAIN DOOR
Filed July 15, 1957 3 Sheets-Sheet 2

INVENTOR.
HENRY WEBSTER
BY Moore, White & Burd
ATTORNEYS

Feb. 14, 1961 H. WEBSTER 2,971,579
GRAIN DOOR
Filed July 15, 1957 3 Sheets-Sheet 3
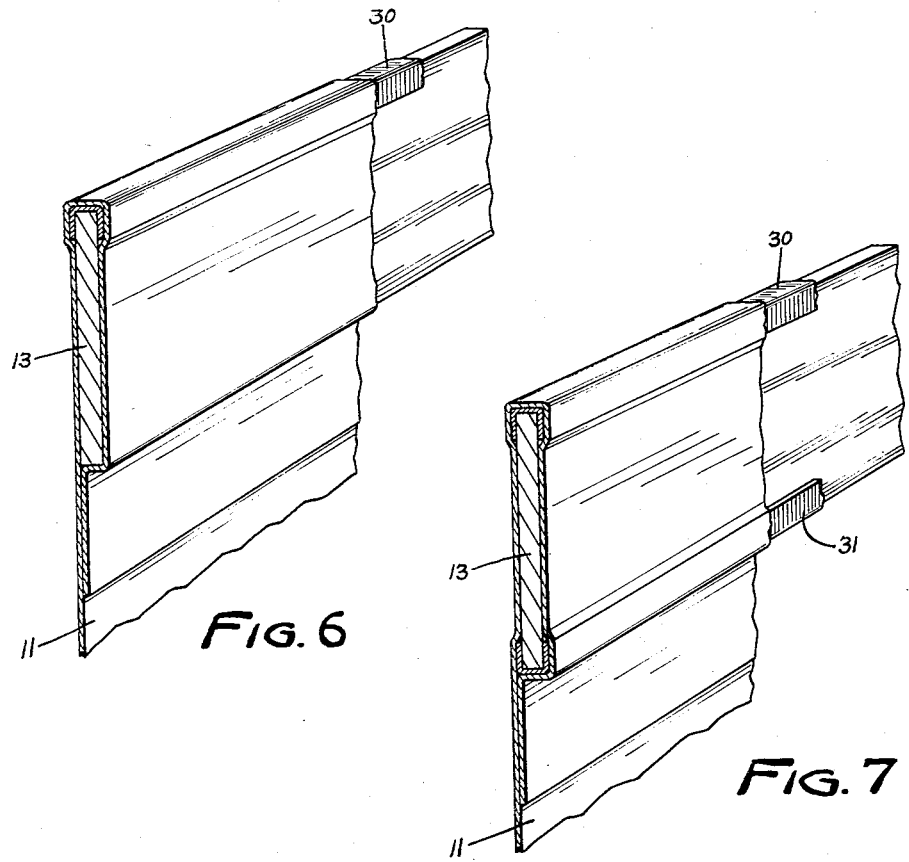
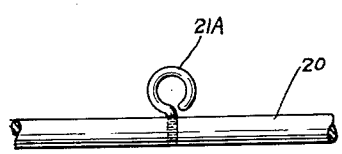
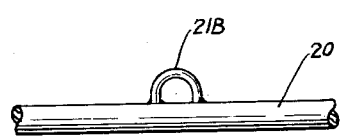
INVENTOR.
HENRY WEBSTER
BY Moore, White & Burd
ATTORNEYS

2,971,579

GRAIN DOOR

Henry Webster, Deephaven, Minn.
(Circle Drive, Rte. 3, Wayzata, Minn.)

Filed July 15, 1957, Ser. No. 672,088

9 Claims. (Cl. 160—368)

This invention relates to so-called grain doors, that is, to the temporary retaining members which are applied over the door openings of railroad boxcars to seal the door openings against leakage and to adapt the boxcars for shipment of bulk material such as grain and the like. This invention constitutes an improvement over the grain door construction disclosed and claimed in my copending application Serial No. 425,345, filed April 26, 1954, now abandoned.

The principal object of this invention is to provide a temporary prefabricated load retaining door member for railroad boxcars and the like which comprises a unitary flexible foldable sheet-like member strengthened and reinforced along its top, bottom and vertical side edges and sized to span the door opening in order that it may be secured to the boxcar floor and side wall members defining the door opening.

A further object of the invention is to provide an inner car door of the class described comprising a web of flexible sheet material reinforced at the bottom by a pair of adjacent substantially rigid horizontal members adapted to be folded at right angles to one another whereby one of the reinforcing members may be secured to the floor of the boxcar and the ends of the adjacent horizontal member may be secured to the inside of the car wall adjacent to the door opening, and reinforced at the top by another horizontal substantially rigid member parallel to the first two and adapted to be secured at its ends to the inner wall of the boxcar adjacent to the door opening, and reinforced along each of its opposite side edges with one or more substantially rigid members adapted to be secured to the inside of the car wall adjacent to the door opening.

Another object of the invention is to provide an inner car door of the class described having means for cross-tying a pair of doors on opposite sides of a boxcar whereby the temporary closure may be reinforced and strengthened against the pressure of the mass of bulk material to be stored in the cars.

Still another object of this invention is to provide an inner car door of the class described further reinforced by means of a rigid rod or channel reinforcing means to supplement the flat top edge reinforcing member.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

Figure 6 is a perspective view, partly in section, showing a fragment of the top of another modified form of grain door construction in which the top edge reinforcing member is strengthened by means of a metal channel;

Figure 7 is a perspective view, partly in section, showing a fragment of the top of still another modified form of grain door construction in which the top edge reinforcing member is doubly strengthened by means of a pair of metal channels;

Figure 8 is an enlarged elevation showing a fragment of one form of the cross-tying and bracing member; and Figure 9 is an enlarged elevation showing a fragment of another form of cross-tying and bracing member.

Figure 1:
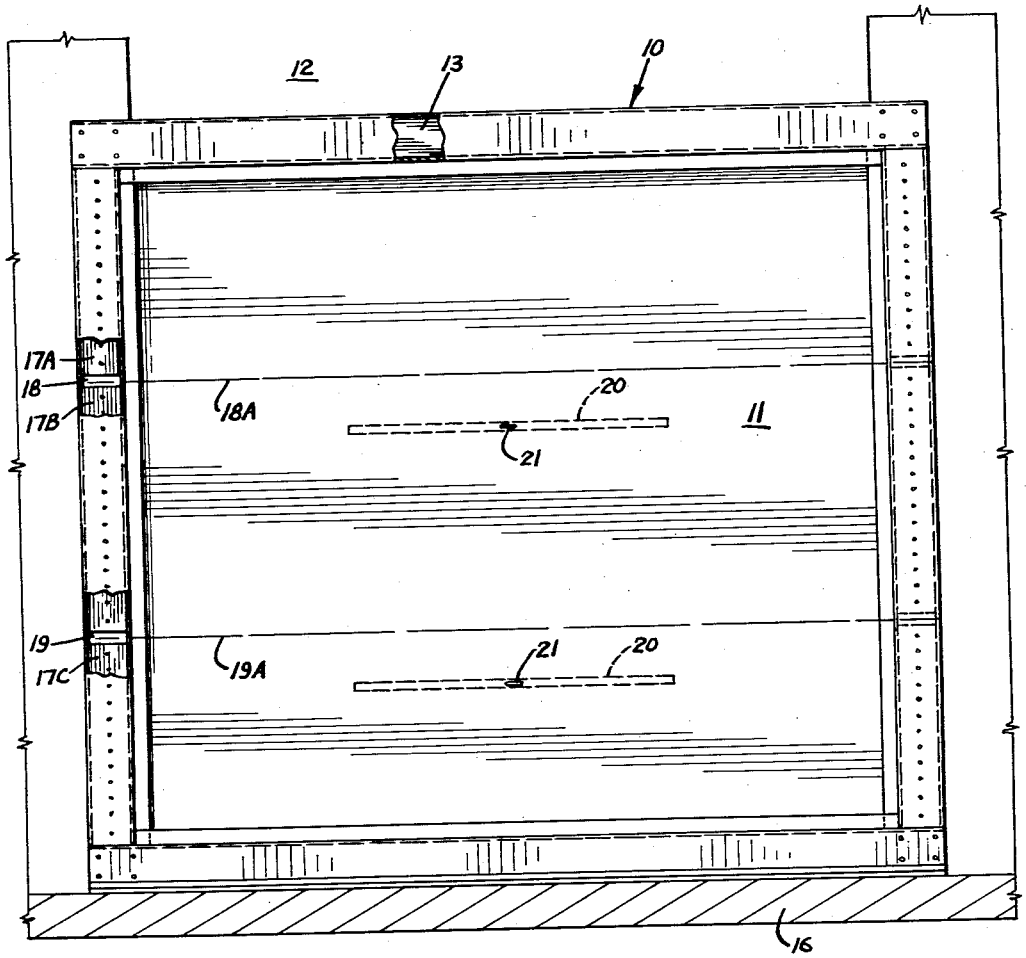
Figure 1 is an elevation showing a portion of an interior wall surface of a conventional railroad boxcar with a grain door according to this invention applied over the door opening.

Referring to the drawings, the temporary car door is indicated generally in 10 and comprises generally a web 11 of sheet material of a size sufficient to span the opening 12 of a boxcar door and overlap the walls adjacent to the door opening. The upper edge of the closure member is provided with an elongated narrow substantially rigid flat reinforcing strip or bar 13 enclosed in a fold of the web 11 and being of a length sufficient to span the car door opening 12 and overlap the adjacent walls. The top reinforcing member 13 and the folded portion of web 11 are adhesively secured to form a unitary composite structure.

The bottom edge of the door closure is provided with a pair of similar flat substantially rigid horizontal reinforcing strips or bars 14 and 15 enclosed in a fold of the web 11 at the bottom of the closure. The reinforcing strips 14 and 15 are parallel to one another and to top reinforcing strip 13. The reinforcing strips 14 and 15 are adjacent but are slightly spaced apart by at least one thickness of the strips so that in use the reinforcing strip 14 may be folded at right angles to the reinforcing strip 15 and the strip 14 may be nailed or similarly fastened to the floor 16 of the boxcar along the entire length of the reinforcing strip and the ends of the reinforcing strip 15 may be nailed or similarly fastened to the inside car wall adjacent to the door openings. The reinforcing strips 14 and 15 and the enfolding portion of the web 11 are adhesively secured together to form a unitary composite structure.

The opposite side edge portions of the web 11 which extend beyond the door opening are also provided with flat substantially rigid reinforcing strips or bars. The side reinforcing members are preferably formed from a plurality of reinforcing sections aligned end to end as, for example, reinforcing sections 17A, 17B, and 17C as shown in Figure 1. The corresponding reinforcing sections at the opposite sides of the door closure are parallel to one another and are of substantially the same length.

Figure 2:
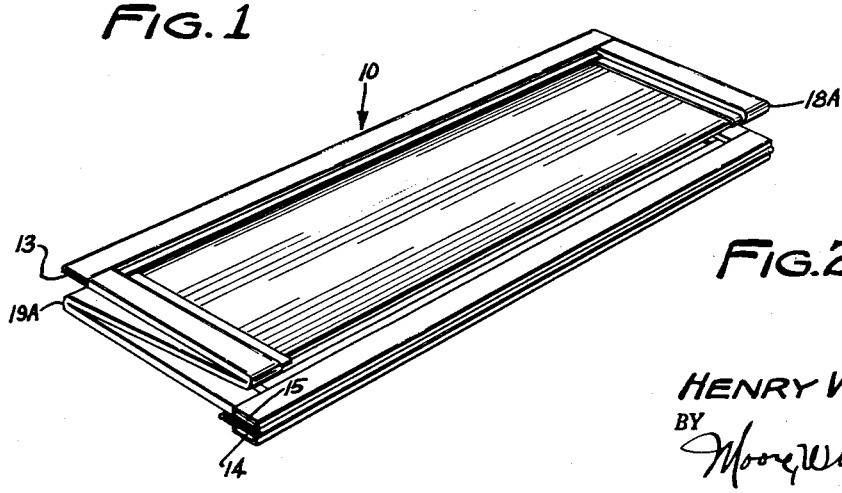
Figure 2 is a perspective view showing the temporary inner door member according to this invention folded for shipment or storage.

The ends of the adjacent reinforcing sections are spaced slightly apart (as indicated at 18 and 19) by a distance at least double the thickness of the individual reinforcing sections to permit the door closure to be folded as, for example, along fold lines 18A and 19A into a more compact structure, as shown in Figure 2, for shipment and storage.

The reinforcing sections 17A, 17B, and 17C and the enfolding portion of the sheet material web 11 are likewise adhesively secured together to form an integral composite structure. The enfolding flap of web 11 around the reinforcing sections 17A, 17B and 17C is preferably in one piece and encloses the spaces between the ends of the reinforcing sections as well as the reinforcing sections themselves. However, if desired, a portion may be cut from the folded flap in the area which would normally overlie the space to facilitate folding if the flexible web 11 is heavy and stiff.

The temporary door closure 10 is provided with one or more rigid reinforcing bars 20 adhesively secured to one side of the web 11 of sheet material 11 and provided with fastening means 21 as a tie brace on the other side of the web. The shank of the eye 21 extends through the web and is secured in the reinforcing rod 20. The rods 20 are preferably disposed horizontally so as not to interfere with the foldability of the grain door. The rods 20 are preferably of a length less than about half of the width of the boxcar door in order to permit an inward bowing of the web 11 from the secured reinforcing and fastening means 13, 14, 15, 17A, 17B, and 17C in a manner described in greater detail hereinafter. Where two or more reinforcing rods 20 are used they are preferably disposed parallel to one another in order to uniformly distribute stresses over the entire grain door surface.

The sheet material from which the web 11 of the door closure is formed may be any relatively thin strong tough flexible material but is preferably a good grade of heavy water repellent paper. Depending upon the particular paper material used it may be single ply or multi-ply. If multi-plied the paper may be further strengthened by means of flexible reinforcing strands or elements such as jute, fiber glass, and the like interposed between the plies.

The reinforcing elements may be formed of a flat, stiff substantially rigid and strong nailable material such as, for example, wood pressboards such as are available under the trademark "Masonite," wood ply boards, wooden slats and the like. In some instances the reinforcing elements may even be formed from strong substantially rigid bonded cardboards. The essential characteristics of the reinforcing elements must include easy nailability along with sufficient strength to prevent the nailheads from pulling loose through the reinforcing elements, substantial strength and rigidity to permit the grain door to be stretched and to remain taut across the expanse of a boxcar opening, and the material should be lightweight to permit ease of shipment, storage, handling and installation.

For added strength, the grain doors according to this invention are preferably formed from a single web of sheet material, that is, the enfolding flaps which enclose the reinforcing elements are preferably integral with the main body of the closure web. This preferred form of construction is shown in greater detail in Figure 4 in connection with the construction of the foot or floor reinforcing strip 14 and the bottom reinforcing strip 15 of the closure. The folded-over paper is firmly secured adhesively to all of the edges of the reinforcing elements and to itself.

Figure 4:
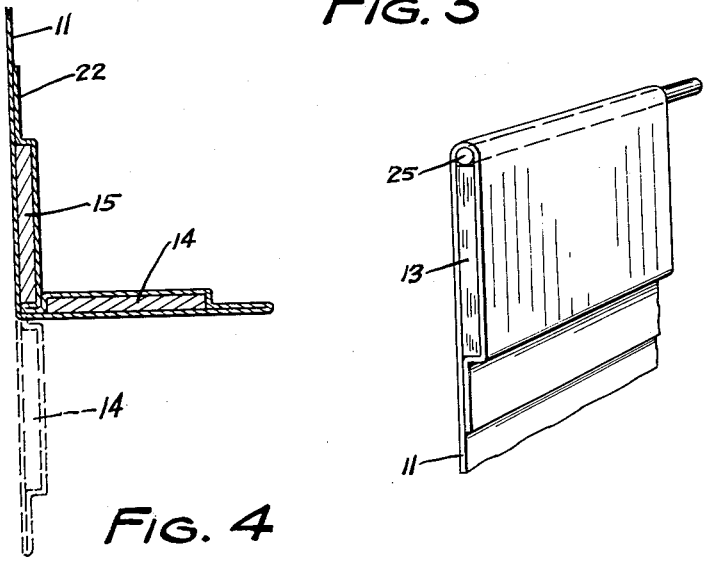
Figure 4 is an enlarged end elevation, in section, showing the details of construction of the bottom of the grain door.

A generous overlap is provided (as indicated in all of the figures and particularly, for example, at 22 in Figure 4) in order to secure a firm bond between the body of the web 11 and the inturned flap. As shown in Figure 4, the enfolding flap member is firmly secured to the web 11 in the space between the two reinforcing members 14 and 15 in order to permit the foot reinforcing member to be folded inwardly at right angles cleanly and without weakening the temporary closure at the fold line. It will be understood that if desired the enfolding portion of sheet material wrapped about the reinforcing elements need not be integral with the main body of the web 11 but may instead be separate strips of sheet material adhesively secured to the main body of the web.

Figure 5:
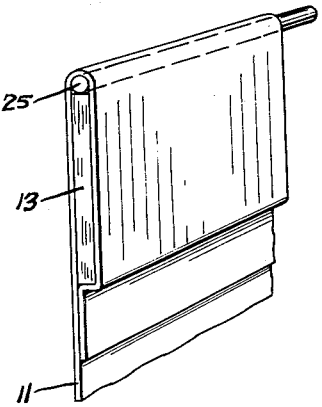
Figure 5 is a perspective view showing a fragment of the top of a modified form of grain door construction.

In Figure 5 there is shown a modified form of top reinforcing structure for a grain door according to this invention. In order to impart additional rigidity and strength to the top reinforcing member 13 a substantially rigid rod 25 having a diameter approximately the same as the thickness of the reinforcing strip 13 is laid along the top edge of the reinforcing strip 13 and enfolded and adhesively secured in the manner heretofore described.

Another modified form of top reinforcing structure is shown in Figure 6. The top edge of the top reinforcing member 13 is provided with a strengthening metal channel 30 extending the length of the reinforcing member. The strengthening channel may desirably be secured to the reinforcing member by means of cement or similar adhesive and is applied to the member 13 before it is enfolded in the top marginal edge of the paper web 11. In Figure 7 there is shown a still further modified form of construction in which the top reinforcing member 13 is additionally strengthened by means of another metal channel 31 secured over its lower edge. The channels 30 and 31 may be formed, for example, from steel, aluminum or the like. Such channels may also be used in identical fashion to reinforce member 15 if desired.

It is understood that in use the temporary door closure covers only a portion of the railroad boxcar door opening so as to leave sufficient space above the temporary closure to permit filling of the car with bulk material from chutes or flexible conduits or the like. Because of this the top of the temporary closure and the top reinforcing element 13 are rigidly secured to the door frame only at the opposite ends of the reinforcing element 13 which overlap the sides of the door frame. For this reason the use of the added reinforcing rod 25 or channels 30 and 31 is often advisable in order to strengthen the top edge of the temporary door closure.

For convenience in shipping, storage and handling the grain door of this invention is preferably folded in the manner illustrated in Figure 2. It will be noted that the inside top portion of the grain door is uppermost and the foot reinforcing element 14 is folded backwardly so as to rest against the outside surface of the door closure.

To use the grain door the foot reinforcing member 14 is first folded forwardly so as to project at approximately a right angle to the bottom edge reinforcing element 15 and the grain door is placed across the bottom of the boxcar door opening and against the inside wall of the car to be used for shipment of bulk material. With the ends of the reinforcing elements 14 and 15 urged tightly against the inside of the bottom of the door frame the operator holds the foot or floor reinforcing member 14 in place by standing upon it with his foot.

With the floor flap thus held he raises the top of the grain door and while holding the top then nails the ends of the bottom reinforcing element 15 to the door posts. The top edge reinforcing element 13 is raised as far as it will go to hold the web 11 taut and the ends of the reinforcing element 13 are nailed to the boxcar door posts. Preferably the ends of the top and bottom reinforcing elements are securely fastened with about four nails to each end.

With the top and bottom reinforcing members secured, the opposite side edge reinforcing sections 17A, 17B and 17C are nailed to the boxcar door post, preferably with a single row of nails at about one and one-half inch centers to insure firm attachment. The floor reinforcing element 14 may, if desired, be secured to the boxcar floor although this is not essential since the weight of the grain or other bulk material pressing down upon the floor flap from the top is sufficient to prevent leakage if the grain door is properly installed.

The door opening on the opposite side of the boxcar is closed in the same manner as the first door opening. In both instances, the grain doors are installed with the reinforcing bars 20 on the outside of the door with the eyes or tie braces 21 on the inside of the car. Because of the flexibility of the sheet material from which the temporary closure is formed, the wide open expanse of the car door opening and the fact that the temporary closure is secured only at its side marginal edges and the ends of the top and bottom, the weight of a large mass of bulk material such as grain inside the car tends to cause the temporary closure to bow or bulge outwardly into the car door opening.

Figure 3:
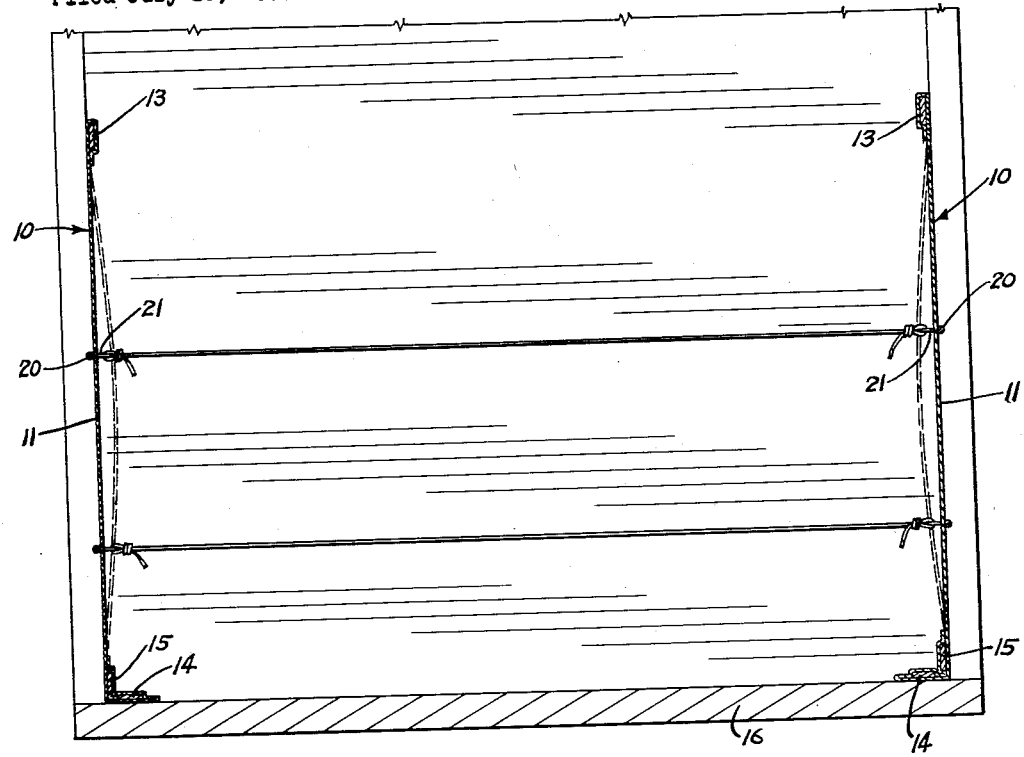
Figure 3 is an end elevation, partly in section, through a portion of the conventional railroad boxcar showing a pair of grain doors applied over the door openings on the opposite sides of the car and cross-tied.

If this bulging of the temporary closure is pronounced the grain door may extend far enough through the opening that when the sliding outer door of the car is closed the inner temporary closure may be abraded or torn. In order to avoid thus damaging the temporary grain doors the temporary closures on the opposite sides of the boxcar are cross-tied by tying the center brace or reinforcing rod 20 of one door to the center brace of the opposite door by means of wire or rope extending from the tie braces 21. The opposite grain doors are cross-tied sufficiently tight so as to draw the temporary closures inwardly at the center by about four inches in order to counteract the outward force of the bulk material loaded into the car. This is shown in broken lines in Figure 3.

Although throughout this specification the reinforcing member 20 has been referred to as a bar or rod, it will be readily apparent that a tubular structure may also be used and for many purposes is advantageous because of its greater strength and lighter weight. Similarly the reinforcing member 25 at the top edge of the grain door as shown in Figure 5 may be tubular in structure.

In Figures 8 and 9 there are shown specific forms of eye tying means which may be used in cooperation with the reinforcing bar, rod or tube 20. In Figure 8 the eye means 21A is shown as a closed ring screw eye which may be screwed directly into the member 20 if it is a wooden rod or a fiber tube. Similar bolt eye means may obviously also be used or an eye may simply be welded or soldered to the reinforcing member 20 in some instances. In Figure 9 the eye means 21B is in the nature of an open ring. If the reinforcing member 20 is composed of wood or other fiber the eye 21B may be formed by driving a staple into the reinforcing member. If the member 20 is a metal rod the eye may be formed by soldering or welding the eye means 21B to it, or obviously it may be in the form of a bolted eye.

The cross-tying and bracing members 20 and 21 are not limited in their utility to the particular grain door of this invention but, on the contrary, may also be used in conjunction with other flexible temporary door closures which have a wide expanse of flexible sheet material across the door opening which may be susceptible to outward bulging and possible damage by the outer car doors.

Although especially designed and used for adapting railway boxcars and the like for shipment of bulk materials such as grain, the closures of this invention are not necessarily limited to this one. On the contrary, they may likewise be used as temporary closures for doorways to prevent doorway damage to boxed and sacked shipments such as is frequently caused by prying or pulling car doors open when the goods in the car are lodged against the doors. Use of the temporary closure of this invention effectively prevents packaged units from becoming lodged in the door opening against the closed outer door and effectively prevents doorway damage to such packaged shipments.

It is apparent that many modifications and variations of this invention as hereinbefore set forth may be made without departing from the spirit and scope thereof. The specific embodiments described are given by way of example only and the invention is limited only by the terms of the appended claims.

I claim:
1. A prefabricated load-retaining door member comprising a web of flexible sheet material of a width in excess of the door opening of a railroad boxcar to which it is to be applied whereby the opposite side marginal edge portions of the sheet extend beyond the door opening and seat against the inside car wall, a first elongated substantially rigid horizontal reinforcing strip of a length in excess of the width of the door opening secured to the top marginal edge of said sheet material, a second similar elongated substantially rigid horizontal reinforcing strip parallel to the first and secured to said flexible sheet material adjacent to the bottom marginal edge thereof, and a third similar elongated substantially rigid horizontal reinforcing strip secured to said flexible sheet material parallel to and slightly spaced apart from said second reinforcing strip whereby said second reinforcing strip may be folded to project at right angles from said third strip, and an elongated substantially rigid vertical reinforcing strip secured to said flexible sheet material adjacent to each of the side marginal edge portions between and perpendicular to said first and third horizontal reinforcing strips, said vertical reinforcing strips being comprised of a plurality of elongated substantially rigid reinforcing sections, the corresponding reinforcing sections on opposite edges of the sheet material being approximately equal in length and aligned end to end but slightly spaced apart between their adjacent ends, whereby said door member may be folded horizontally.

2. A prefabricated load-retaining door member according to claim 1 further characterized in that at least said top and side reinforcing strips are enclosed in a folded-over marginal portion of said flexible sheet material.

3. A prefabricated load-retaining door member according to claim 1 further characterized in that at least one further elongated substantially rigid reinforcing member is disposed against one side of said web of flexible sheet material intermediate of said marginal reinforcing strips and a tying means secured to said reinforcing member is provided on the opposite side of said flexible sheet material.

4. A prefabricated load-retaining door member according to claim 3 further characterized in that said intermediate reinforcing member is in the shape of an elongated rod of a length less than the door opening and said tying means is an eye.

5. A prefabricated load-retaining door member according to claim 1 further characterized in that said top horizontal reinforcing strip is further strengthened by the superposition of an elongated substantially rigid reinforcing element upon the top edge of said strip.

6. A prefabricated load-retaining door member according to claim 2 further characterized in that said second and third horizontal reinforcing strips are enclosed in a folded-over bottom marginal portion of said sheet material.

7. A prefabricated load-retaining door member according to claim 6 further characterized in that said folded-over marginal portions of said sheet material are integral with the body thereof and said reinforcing strips are adhesively secured thereto.

8. A prefabricated load-retaining door member comprising a web of flexible sheet material of a width in excess of the door opening of a railroad boxcar to which it is to be applied whereby the opposite side marginal edge portions of the sheet extend beyond the door opening and seat against the inside car wall, a first elongated substantially rigid horizontal reinforcing strip of a length in excess of the width of the door opening secured to the top marginal edge of said sheet material, a second similar elongated substantially rigid horizontal reinforcing strip parallel to the first and secured to said flexible sheet material adjacent to the bottom marginal edge thereof, and a third similar elongated substantially rigid horizontal reinforcing strip secured to said flexible sheet material parallel to and slightly spaced apart from said second reinforcing strip whereby said second reinforcing strip may be folded to project at right angles from said third strip, and elongated substantially rigid vertical reinforcing strips secured to said flexible sheet material adjacent to each of the side marginal edge portions between and perpendicular to said first and third horizontal reinforcing strips, said vertical marginal side edge reinforcing strips comprising a plurality of elongated substantially rigid reinforcing sections, the corresponding reinforcing sections on opposite side edges of the sheet material being approximately equal in length and aligned end to end but slightly spaced apart between their adjacent ends whereby said member may be folded horizontally, all of said reinforcing strips being enclosed in folded-over marginal portions of said flexible sheet material and adhesively secured thereto, and a pair of elongated substantially rigid horizontal reinforcing rods of a length less than the door opening disposed parallel and spaced apart against one side of said web of flexible sheet material intermediate of said marginal reinforcing strips and tying means on the opposite side of said flexible sheet material secured to each of said reinforcing rods.

9. A prefabricated door retaining member according to claim 8 further characterized in that said folded-over marginal portions of said flexible sheet material are integral with the web of sheet material.

References Cited in the file of this patent

UNITED STATES PATENTS

| | | |
|---|---|---|
| 2,361,081 | Brandon | Oct. 24, 1944 |
| 2,462,309 | Dyke | Feb. 22, 1949 |
| 2,581,991 | Weiss | Jan. 8, 1952 |
| 2,595,087 | Leslie | Apr. 29, 1952 |
| 2,689,608 | Suess | Sept. 21, 1954 |
| 2,803,299 | Gerrard et al. | Aug. 20, 1957 |
| 2,830,659 | Gerrard | Apr. 15, 1958 |
| 2,845,118 | Ford | July 29, 1958 |